United States Patent [19]

Lake

[11] 4,238,028
[45] Dec. 9, 1980

[54] FLIGHT CONVEYOR

[75] Inventor: Robert C. Lake, Franklin, Pa.

[73] Assignee: Joy Manufacturing Company, Pittsburgh, Pa.

[21] Appl. No.: 819,736

[22] Filed: Jul. 28, 1977

Related U.S. Application Data

[63] Continuation of Ser. No. 672,568, Mar. 31, 1976, abandoned.

[51] Int. Cl.³ .............................................. B65G 19/24
[52] U.S. Cl. .................................... 198/731; 198/733
[58] Field of Search ................ 198/728, 730, 731, 733

[56] References Cited

U.S. PATENT DOCUMENTS

| 2,450,501 | 10/1948 | Clarkson | 198/733 |
| 2,761,548 | 9/1956 | Long | 198/733 |
| 3,324,990 | 6/1967 | Karlovsky | 198/733 |

Primary Examiner—Joseph E. Valenza
Attorney, Agent, or Firm—George Patrick Baier

[57] ABSTRACT

A flight conveyor and more particularly a flight conveyor including an improved means for attaching the flights to the conveyor chain.

5 Claims, 3 Drawing Figures

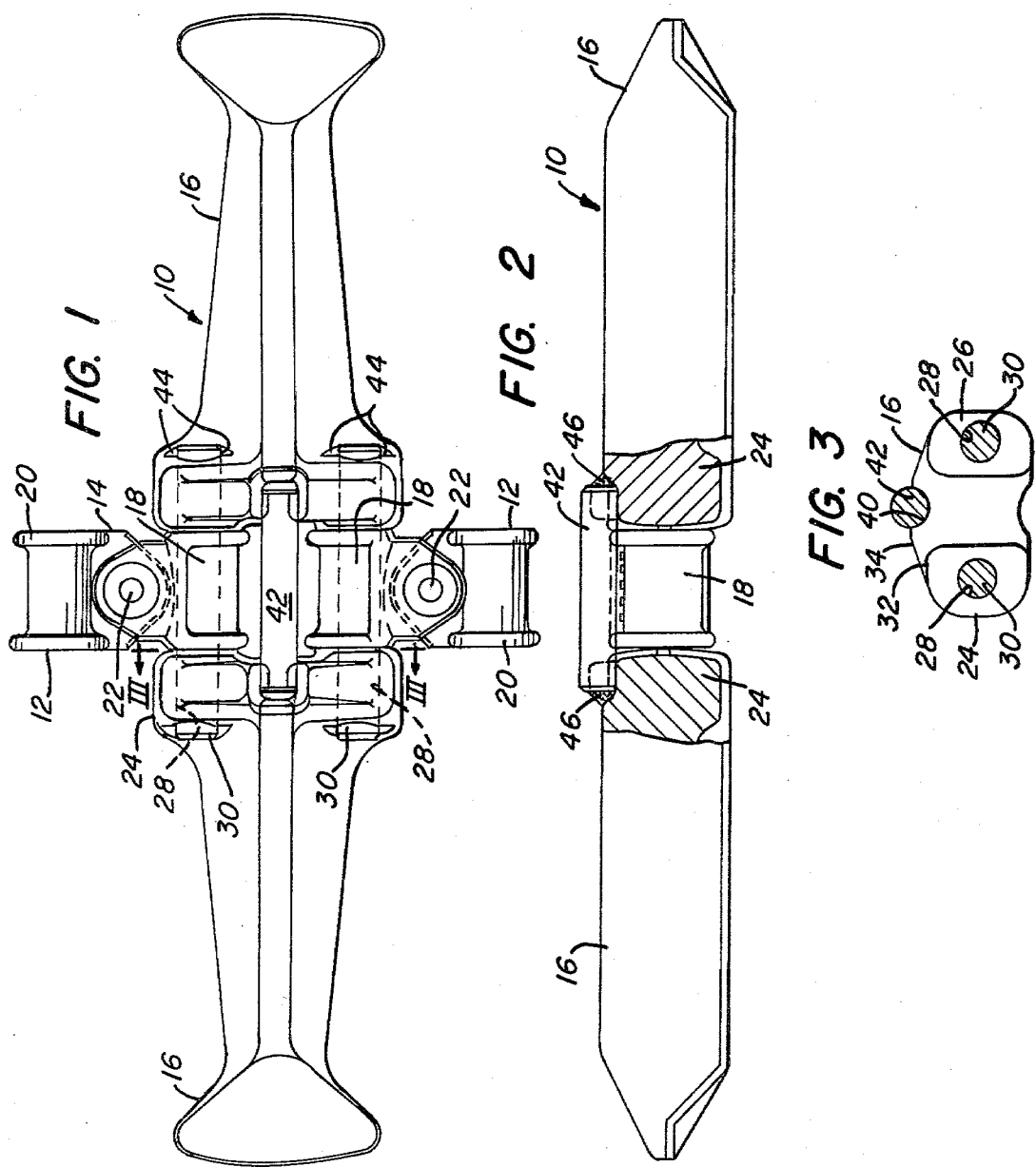

FLIGHT CONVEYOR

This is a continuation, of application Ser. No. 672,568, filed Mar. 31, 1976 and now abandoned.

Flight conveyors employing a central sprocket driven chain with elongated flights extending laterally in opposite directions from spaced sides of the center chain are extensively used for the conveying of material. These types of flight conveyors travel over flat surfaces wherein the laterally extending flights cooperate with the flat surfaces or deck to move material therealong. Where such sprocket driven flight conveyors are used on loading machines, the flights are required to move heavy materials, such as large masses of coal, rock, iron ore, and the like, along the deck plates. In such structures the flights travel closely to the deck plates in a manner which results in large bending stresses at the flight connections to the chain as a result of irregular surface or sudden jarring as where large chunks of material drop from above onto the flights. Furthermore, inasmuch as the flights cantilever outwardly from the chain connections, such connections are subject to repeated stress reversals which result in residual fatigue stress within the connecting section. Still further, in instances where the flight conveyors are used in a longwall mining system the chain quite often will travel around slight semi-sinusoidal bends thereby resulting in applied moment in the horizontal direction being directed to the flight connections. In view of these conditions it is desired that the flight connection to the chain and the section modulus across the flights be sufficiently large to resist the applied moment and residual stresses.

Prior flight conveyor configurations, for example as illustrated in U.S. Pat. No. 3,103,275, have generally connected a pair of transversely spaced flights to the conveyor chain by two transverse pins extending through the flight flanges and coaxially aligned chain links. These configurations have worked adequately in many instances; however, they often fell short of providing sufficient section to resist applied moment and residual stresses.

By means of the present invention which includes a built up flight section at the connection portion in conjunction with a third connecting pin on an axis vertically spaced from the lower connecting pins, a flight having a greater section modulus and increased structural rigidity is achieved without significantly effecting the operating profile of the flight conveyor or creating weak sections at the flight connection.

These and other objects and advantages of the present invention will become more readily apparent upon a reading of the following description and drawings in which:

FIG. 1 is a plan view of a portion of a flight conveyor constructed in accordance with the principles of the present invention having a pair of flights connected to a pair of universal joints of a suitable roller chain structure;

FIG. 2 is a side view, partially in section, of the pair of flights illustrated in FIG. 1; and FIG. 3 is a cross-sectional view across the flight connecting section taken on lines 3—3 of FIG. 2.

Flight conveyor 10 comprises a suitable elongated conveyor chain 12, of which only the connection joints 14 are illustrated; and a pair of elongated flights 16 which extend laterally in opposite directions from transversely spaced sides of connection joints 14.

Connection joints 14 are of a type quite well known in the art and as illustrated each joint 14 comprises two generally cylindrical tubular members 18 and 20 having laterally spaced parallel axes which extend transversely of the longitudinal axis of the conveyor chain. The members 18 and 20 each have cooperable laterally extending portions which are suitably horizontally pivotally connected together by a vertically extending pin 22. In assembly, member 18 is received between a pair of flights 16 in a manner as described hereinafter, and member 20 is horizontally pivotally connected to adjacent links of conveyor chain 12 in a well known manner. It is to be noted that connection joints 14 as illustrated are also known as a universal joint and is fully illustrated and described in U.S. Pat. No. 3,103,275; however, the invention herein will be equally applicable to a single articulated joint 14 of the type which is illustrated in U.S. Pat. No. 2,761,548.

The flights 16 may be of any suitable configuration and are illustrated as having a generally "T" shaped cross section along the major longitudinal extent thereof with the stem of the "T" extending upwardly and having the inner end connecting portion 24 thereof of a differing cross-sectional configuration. Connecting portion 24 includes a main base portion 26 of a generally rectangular configuration with the elongated or long side thereof extending in a direction generally transverse to the longitudinal axis of the flight 16. Base portion 26 includes a pair of longitudinally spaced pin receiving bores 28 therethrough which are each adapted to receive a flight connecting pin 30 therethrough in a manner as described hereinafter. The longitudinal axis of spaced bores 28 are at a common elevation.

A secondary connecting portion 32 has a generally triangular cross section and extends upwardly from base portion 26. The outer edges of portion 32 are coincident with the respective axial ends of base portion 26 and portion 32 tapers upwardly and inwardly therefrom in a manner that the uppermost portion 34 thereof lies at the apex of the triangular cross section of portion 32 and is intersected by a plane extending through the longitudinal axis of flight 16. This triangular configuration allows for three-point connection of the flight pairs 16, namely by the two connecting pins 30, and the secondary connecting pin 42. The uppermost extent of portion 34 includes an upwardly open groove 40 therein which extends transversely thereacross and is adapted to receive an end portion of a secondary flight pin 42 therein in a manner as described hereinafter. FIG. 3 shows a cross-section of the bottom opening cavity or pocket formed between flight pairs 16, connecting pins 30, and secondary connecting pin 42. This pocket and tubular members 18 are adapted for use with a conventional sprocket wheel.

In assembled position an adjacent pair of tubular connecting members 18 are positioned intermediate a spaced pair of oppositely extending flights 16. The members 18 are then coaxially aligned with respective bores 28 of the spaced flights 16 and a pair of connecting pins 30 are then received through the aligned openings and members 18. After reception, the pins 30 are firmly secured into position with respect to flights 16 in any suitable manner, for example by welding at axial end points 44 directly to flight connecting portion 24. The particular connecting portion arrangement described hereinabove is generally used in prior art; however, the usage of the secondary connecting pin 42 and the secondary connecting portion 32 is the primary unique feature of this invention. With connecting members 18 and flights 16 positioned as described hereinabove a secondary connecting pin 42 is positioned within aligned grooves 40 and firmly secured into position for example by welding at end points 46. As shown in FIG. 3 the lowermost surface of the secondary connecting pin 42 is higher than the uppermost surface of the flight connecting pins 30. Such positioning allows for engagement of the tubular members 18 or connecting pins 30 by a conventional sprocket wheel.

The invention herein relates to an improved flight connection arrangement and it is contemplated that those skilled in the art may make changes to the embodiment described hereinabove without departing from the scope of the invention, for example: upper portions 34 may have bores therethrough rather than the grooves 40; the configuration of secondary portion 32 may be varied; more than one secondary pin 42 may be used so long as additional aligned receiving grooves or bores are provided in portion 32; and the like. Accordingly, the scope of this invention is to be defined only by the scope of the claims appended hereto.

What is claimed is:

1. In a flight conveyor having a plurality of spaced pairs of axially aligned elongated flights which extend outwardly from opposite sides of chain connecting portions of a center driven conveyor chain, the improvement comprising: said flights having flight connecting portions adjacent the inner axial ends thereof; a pair of elongated transversely spaced connecting pins each of which extends in the longitudinal direction of said flights and communicate between a respective chain connecting portion and said flight connecting portions of a pair of said flights to secure said pair of flights to said chain connecting portions; the respective longitudinal axes of each of said connecting pins extending at a common elevation and in a common horizontal plane; at least a third elongated connecting pin rigidly communicating between said flight connecting portions of said pair of said flights; and the longitudinal axis of said third connecting portion being parallel to and at an elevation higher than said axes of said first mentioned connecting pins and the lowermost surface of said third connecting portion being at an elevation higher than the uppermost surface of said chain connecting portions whereby a pocket is formed.

2. A flight conveyor as specified in claim 1 including only a single third connecting pin.

3. A flight conveyor as specified in claim 1 wherein said flight connecting portions include an integral upwardly extending portion and said third connecting pin communicates between said upwardly extending portions of said pairs of said flights.

4. A flight conveyor as specified in claim 3 wherein said third connecting pin is welded to said upwardly extending portions adjacent respective axial ends of said third connecting pin.

5. A flight conveyor as specified in claim 3 wherein each of said upwardly extending portions include an upwardly open groove therein and said third connecting pin is seated within said groove.

* * * * *